United States Patent [19]
Ruhl

[11] 3,938,842
[45] Feb. 17, 1976

[54] BUMPER GUARD ASSEMBLY

[75] Inventor: Edward A. Ruhl, Southfield, Mich.

[73] Assignee: Robin Products Company, Warren, Mich.

[22] Filed: May 20, 1974

[21] Appl. No.: 471,784

[52] U.S. Cl. .................. 293/71 R; 52/716; 293/88
[51] Int. Cl.² .................................... B60R 19/08
[58] Field of Search .......... 293/71 R, 88, 62, 65, 99; 52/716, 717, 718

[56] References Cited
UNITED STATES PATENTS

| | | | |
|---|---|---|---|
| 2,954,256 | 9/1960 | Barenti | 293/88 X |
| 3,820,835 | 6/1974 | Wilfert | 293/71 R X |
| 3,841,682 | 10/1974 | Church et al. | 293/71 R |

Primary Examiner—M. Henson Wood, Jr.
Assistant Examiner—Gene A. Church
Attorney, Agent, or Firm—Cullen, Settle, Sloman & Cantor

[57] ABSTRACT

A bumper assembly including an elongated metal bumper, at least one self-supporting impact resistant plastic upright bumper guard and at least two longitudinal bumper guards secured to the bumper on opposed sides of the upright bumper guard. The upright bumper guard includes a U-shaped portion conforming to the bumper and opposed integral tabs which overlie the bumper and include integral connectors. The longitudinal bumper guards are channel-shaped in transverse cross-section and enclose the upright bumper guard tabs. The longitudinal bumper guards include connectors integral with the side walls of the channel. The bumper includes a plurality of apertures which lockingly receive the connectors. The upright bumper guard is assembled first on the bumper and the longitudinal bumper guards are disposed over the upright bumper guard tabs and secured in place by forcing the connectors in the bumper apertures.

19 Claims, 8 Drawing Figures

BUMPER GUARD ASSEMBLY

FIELD OF THE INVENTION

This disclosure relates to a bumper assembly and method utilizing impact resistant plastic bumper guards, including an upright bumper guard and longitudinal bumper guards suitable for protecting vehicle bumpers, panels and the like from normal wear and damage. The bumper guard assembly may also be utilized in other applications, such as appliances and the like.

DESCRIPTION OF THE PRIOR ART

The bumper assembly, guards and method of this invention eliminates the requirement for a separate adapters and clips which are utilized in the conventional automotive molding assemblies disclosed by the prior art. The adapter or clip of the prior art molding assembly is first received on a headed fastener and the molding or trim strip is then snapped or telescopically received over the adapter or clip. The adapter or clip may also be disposed within the trim strip, prior to assembly, and the molding is then snapped or otherwise secured to the headed fasteners, interconnecting the adapters or clips to the fasteners.

A resilient bumper assembly serves two primary functions. The bumper may be utilized for decorative purposes in automotive applications for example and the projecting bumper also serves to protect the supporting surface. More recently, impact resistant plastic bumper guards have been developed which include integral tubular connectors which are received within mating panel apertures and secured in place. These bumper guards have been used both to protect the bumper itself and the vertical metal bumper guards normally used in automotive applications. The metal bumper guards may also include a plastic guard, which is an elongated strip secured to the bumper guard. Such strips do not however protect the bumper guard from side impact.

The bumper guards and assembly of the present invention includes an elongated longitudinal bumper guard, which is an improvement over the prior longitudinal bumper guards and an integral self-supporting plastic upright bumper guard which will resiliently yield under side impact and eliminates the requirement for an upright metal guard.

SUMMARY OF THE INVENTION

The bumper assembly of this invention includes an elongated metal bumper, which may be a metal extrusion, such as aluminum. The upright bumper guards are formed from an impact resistant resilient plastic material and are self-supporting. The upright bumper guard is channel-shaped in transverse cross-section, opening toward the bumper and includes opposed integral tab portions overlying the bumper and secured to the bumper. The assembly preferably also includes at least two longitudinal bumper guards preferably formed of impact resistant resilient plastic. The longitudinal bumper guards are channel-shaped in cross-section, opening toward the bumper and are secured on opposite sides of the bumper guard, enclosing the upright bumper guard tabs.

In the preferred embodiment of the bumper assembly, the upright bumper guard tabs include integral connectors which are secured to the bumper. The connectors for the longitudinal bumper guards are integral with the side walls of the bumper guard. A resilient plastic foam insert may also be enclosed in the channel-shaped bumper guards to provide additional impact resistance and structural integrity during impact. The disclosed embodiment of the upright bumper guard includes a box-shaped enclosure which receives the foam plastic insert.

The method of this invention then includes forming a plurality of spaced apertures in the bumper configured and spaced to receive the connectors of the bumper guards. The upright bumper guard is then secured to the bumper by disposing the U-shaped portion over the bumper and securing the connectors on the bumper tabs. Finally, the longitudinal bumper guards are secured on opposed sides of the upright bumper guard by locating the longitudinal guards generally in the longitudinal axis of the bumper and enclosing the upright guard tabs and securing the connectors in the bumper apertures.

Other advantages and meritorious features of the present invention will be more fully understood from the following description of the preferred embodiments and the method of this invention and the drawings, a description of which follows.

DESCRIPTION OF THE PREFERRED EMBODIMENTS AND METHOD OF THIS INVENTION

Figure 1:
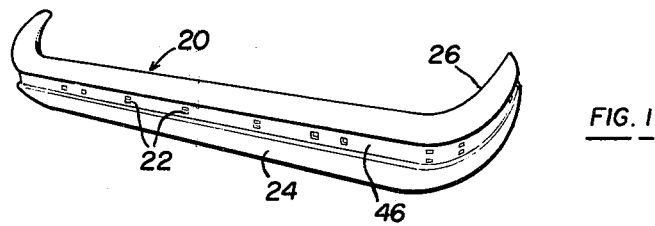
FIG. 1 is an end elevation of a metal bumper utilized in the bumper assembly of this invention.

FIG. 1 illustrates a metal bumper 20 which is suitable for the bumper assembly of this invention. An automotive bumper for example is generally made of steel having a chrome bright metal finish, however the metal bumper shown in FIG. 1 may be formed of an extrusion of aluminum or similar metals, particularly because of the bumper guard assembly described below. The bumper includes a plurality of generally rectangular apertures 22 which are aligned generally along the longitudinal axis of the bumper and receive the connectors of the bumper guard assembly. The disclosed bumper is shaped for automotive applications, including a linear portion 24 which extends across the rear of the automobile, for example, and curved portions 26 which wrap around the rear quarter panels. It will be understood that the shape and design of the bumper does not form a part of the invention, except as described hereinbelow.

Figure 2:
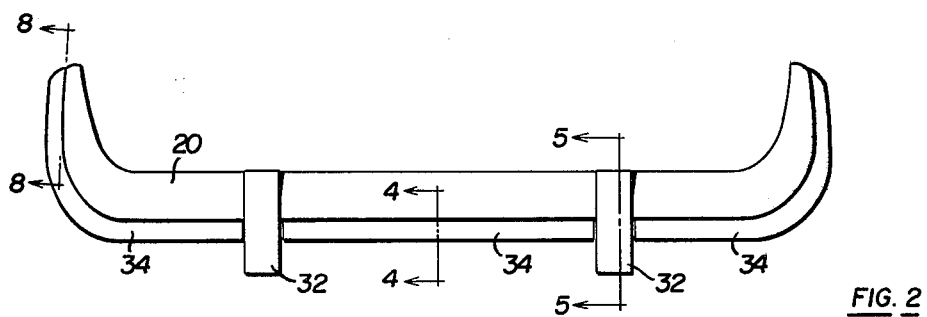
FIG. 2 is a top elevation of the bumper shown in FIG. 1, with the bumper guards secured in place.
Figure 3:
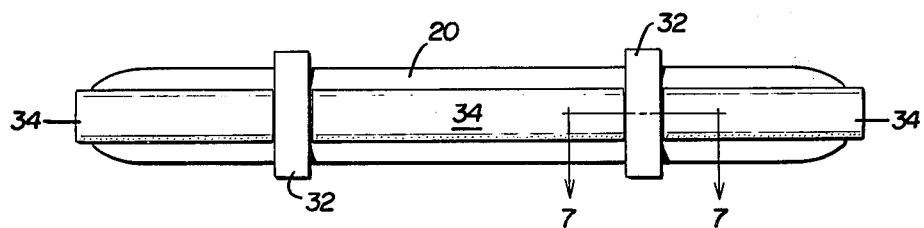
FIG. 3 is an end view of the bumper assembly shown in FIG. 2.

The bumper assembly 30 shown in FIGS. 2 and 3 include two vertical or upright bumper guards 32 and three longitudinal bumper guards 34 generally in the longitudinal axis of the bumper 20. The bumper guards 32 and 34 are preferably formed of a resilient impact resistant plastic having sufficient structural integrity to resiliently absorb impact. As described above, the upright bumper guards 32 are self-supporting, eliminating the requirement for a metal bumper guard, frame or further metal support. The preferred material for the resilient bumper guards of this invention will however depend upon the particular application. A suitable material for an automotive bumper guard is a high impact polyethylene sold by E. I. du Pont de Nemours and Co. under the tradename "Surlyn". Other suitable plastic materials may also be used.

Figure 4:
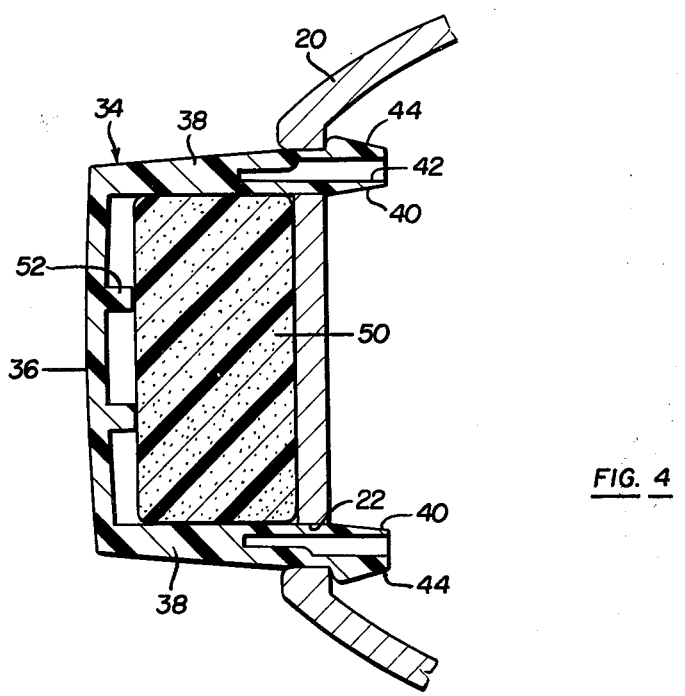
FIG. 4 is a side cross-sectional view of the longitudinal bumper guard and assembly shown in FIG. 2, in the direction of view arrows 4—4.
Figure 8:
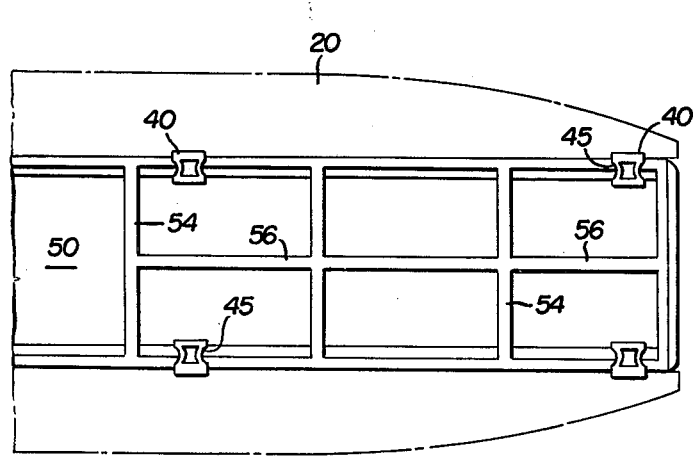
FIG. 8 is a reverse end view of the longitudinal bumper guard shown in FIG. 2, in the direction of view arrows 8—8.

The structure of the horizontal or longitudinal bumper guard 34 is best shown in FIGS. 4 and 8. The longitudinal bumper guard is channel-shaped in cross-section, as shown in FIG. 4, having an end wall 36 and side walls 38. The longitudinal bumper guards include a plurality of spaced connectors 40, as shown in FIG. 8, which are preferably integral with the side walls 38 as shown in FIG. 4. The disclosed connectors are tubular, having an opening 42 and inclined camming portions 44. The side walls of the connectors including the camming portions 44 are relatively rigid to collapse the end walls 45 inwardly during receipt of the connectors in the rectangular panel apertures 22. The advantages of the tubular connectors are more fully disclosed in the copending application of the Assignee herein, Ser. No. 362,638, filed May 21, 1973, now U.S. Pat. No. 3,842,565, incorporated herein by reference.

Figure 6:
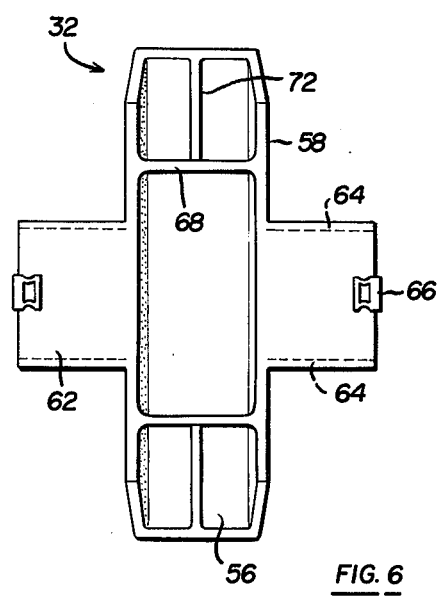
FIG. 6 is an end view of the upright bumper guard shown in FIG. 5, in the direction of view arrows 5—5.

A rectangular plastic foam insert 50 is disposed within the channel-shaped longitudinal bumper guard 34 in the disclosed embodiment, which will provide additional resistance to impact loading. Ribs 52 integral with the end wall 36 extend into the channel-shaped recess to contact the plastic foam insert 50 and prevent the insert from moving in the channel. The foam insert may be formed of any suitable material, such as foamed "Surlyn" described above. Additional support may also be provided in the disclosed embodiment by integral vertical and longitudinal webs, 54 and 56 respectively, as shown in FIG. 6. In the disclosed embodiment, the webs are provided adjacent the ends of the longitudinal bumper guard.

Figure 5:
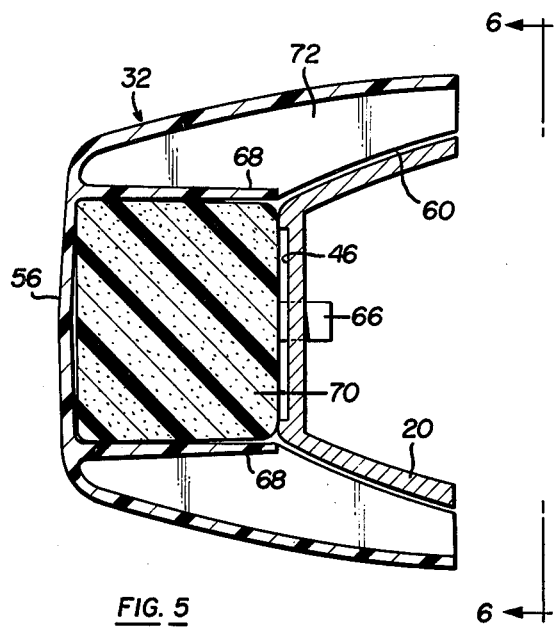
FIG. 5 is a side cross-sectional view of the bumper assembly of FIG. 2, in the direction of view arrows 5—5.
Figure 7:
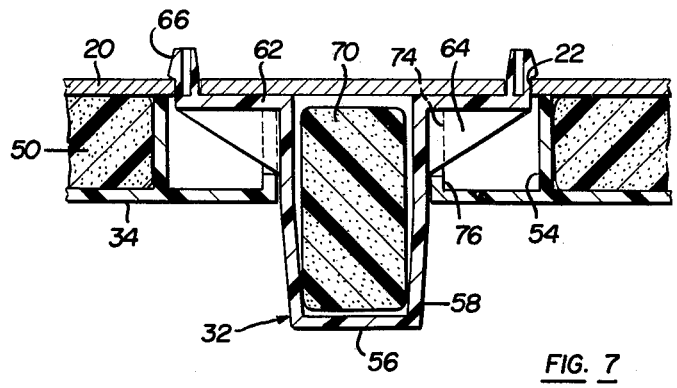
FIG. 7 is a top cross-sectional view of the bumper assembly shown in FIG. 3, in the direction of view arrows 7—7.

The structure of the disclosed vertical or upright bumper guards 32 is shown in FIGS. 5 to 7. The upright bumper guards are also generally channel-shaped in cross-section, including a U-shaped end wall 56 and integral, opposed side walls 58. A U-shaped cut-out 60 is defined in the side walls to receive the U-shaped bumper 20, as best shown in FIG. 5. The preferred embodiment of the upright bumper guards also include opposed tab portions or wings 62 which are integral with the side walls as shown in FIGS. 6 and 7. The tabs include integral triangular gusset portions 64 and tubular connectors 66 for securement of the upright bumper guards 32 to the bumper 20.

In the disclosed embodiment, a box-shaped chamber is defined in the upright bumper guards, opposite the bumper, including the vertical side walls 58 and end walls 68 which also reinforce the bumper channel. A foamed plastic insert 70 is received within the chamber for additional reinforcement. Further, vertical webs 72 may be provided, as shown in FIGS. 5 and 6, which reinforce the ends of the bumper guard 32. As described above, the upright bumper guard of this invention is preferably self-supporting and will absorb end and side impact. End impact against end wall 56 will tend to resiliently collapse the channel-shaped structure and side impact will be absorbed by the side walls 58 and the gusset portions 64. On side impact, for example, one gusset portion will be placed in tension and the opposed gusset will be compressed, resiliently absorbing the impact.

The method of assemblying the bumper guards is best illustrated by FIG. 7. First, the upright bumper guards are secured in place by aligning the connectors 66 with the bumper apertures 22. The opposed or distal ends of the tabs 62 are then impacted or pressed toward the bumper 20, collapsing the tubular connectors and receiving the connectors within the panel apertures, in locking engagement. The longitudinal bumper guards 34 are then connected to the bumper 20 on opposed sides of the upright bumper guards, first by disposing the longitudinal guards over the upright bumper tabs 62, then aligning the connectors with the longitudinal apertures in the bumper and finally urging the connectors into the parallel rows of spaced parallel apertures in the bumper. In the disclosed embodiment, spaced slots 74 are provided in the end walls 76 of the longitudinal bumper guards for receipt of the triangular gusset portion 64 of the vertical bumper guard. The tab portions 62 are thereby enclosed and hidden from view, providing continuous protection for the bumper 20, as best shown in FIGS. 3 and 7. The disclosed embodiment of the bumper includes a channel or recess 46, as shown in FIGS. 1 and 5, which closely receives and aligns the longitudinal bumper guards 34, as shown in FIG. 4.

The bumper guard assembly of this invention thus provides a high impact resistant bumper guard assembly which is continuous along the length of the bumper, as best shown in FIGS. 2 and 3. The upright or vertical bumper guards 32 and the longitudinal bumper guard 34 may each be formed of a single plastic member, except where foam plastic inserts are utilized. The necessity for the foam plastic insert will depend upon the particular application. The bumper guard assembly is therefore rust-proof, particularly where an aluminum extruded bumper is utilized and provides an attractive high impact resistant bumper assembly. It will be understood however that modifications may be made to the disclosed bumper assembly without departing from the perview of the following claims. For example, the longitudinal bumper guards 34 may be used independently of the upright guards, or vice versa. Further, the design and shape of the metal bumper 20 may be modified for any particular application.

I claim:

1. A bumper assembly, comprising in combination, an elongated metal bumper, at least one self-supporting impact resistant plastic upright member having a longitudinal axis generally perpendicular to the longitudinal axis of said bumper, said upright member being channel-shaped in transverse cross-section, opening toward said bumper and having integral opposed tab portions extending longitudinally of said bumper and secured to said bumper by connectors generally perpendicular to the longitudinal axis of said bumper, and at least two elongated impact resistant plastic bumper guards, channel-shaped in transverse cross-section and opening toward said bumper, said bumper guards being secured to said bumper on either side of said upright member, said guards lying generally in the longitudinal axis of said bumper and enclosing said upright member tabs adjacent said upright member.

2. The bumper assembly defined in claim 1, wherein said upright member tabs and said bumper guards each includes integral connectors projecting toward said bumper and said bumper includes apertures receiving and retaining said connectors.

3. The bumper assembly as defined in claim 2, wherein said channel-shaped bumper guards each include side walls abutting said bumper and an integral end wall spaced from said bumper and said connectors integral with the side walls of said bumper guards.

4. The bumper assembly defined in claim 1, wherein said upright member includes an integral box-shaped enclosure opening toward said bumper, including the longitudinal side walls of said bumper guard and end walls spaced from the distal ends of said bumper guard and a solid resilient plastic member received in said enclosure providing additional impact resistance and structural integrity during impact.

5. The bumper assembly defined in claim 1, wherein said channel-shaped bumper guards each include an elongated solid resilient plastic insert therein, abutting said bumper.

6. The bumper assembly as defined in claim 5, wherein said plastic insert is foamed plastic and said bumper guards include integral ribs projecting into said channel, abutting said insert.

7. An elongated bumper guard formed of an impact resistant, resilient plastic material for securement in overlying relating to a metal bumper having two rows of spaced apertures, said bumper guard being channel-shaped in transverse cross-section and having an end wall and integral opposed side walls forming a hollow box-shaped structure, and a plurality of connectors integrally formed on each of said side walls and projecting generally in the plane of said side walls to be received in the spaced apertures in said bumper.

8. The bumper guard as defined in claim 7, wherein said guard includes an elongated solid foam plastic insert generally rectangular in transverse cross-section.

9. The bumper guard as defined in claim 8, wherein said bumper guard includes at least one integral rib projecting into said channel, abutting said insert.

10. The bumper guard as defined in claim 7, wherein said connectors are tubular, each having at least one camming protuberance projecting from the side of the bumper guard.

11. A self-supporting upright bumper guard formed of an impact resistant resilient plastic for securement to a metal bumper, transverse to the longitudinal bumper axis, said bumper guard being channel-shaped in cross-section having side walls and an integral end wall, support tabs integrally joined to said side walls and projecting from said side walls generally perpendicular thereto and integral connectors joined to said support tabs generally parallel to said side walls for securement in apertures in said bumper.

12. The upright bumper guard defined in claim 11, wherein said side walls have a U-shaped cut-out to conform to the bumper and said tabs are integrally joined to the side walls adjacent said cut-out, generally perpendicular to said side walls.

13. The upright bumper guard defined in claim 12, wherein said end wall of said guard is U-shaped and generally parallel to the edges of said cut-outs.

14. The upright bumper guard defined in claim 11, wherein said tabs include triangular gusset protions integrally joined to said tabs and said side walls.

15. The upright bumper guard defined in claim 11, wherein said guard includes a generally rectangular foam plastic insert disposed in the channel defined by said end and side walls.

16. The upright bumper guard defined in claim 15, wherein said guard includes a box-shaped enclosure defined by said side walls and opposed enclosure end walls integral with said side walls and said insert is received within said enclosure.

17. A bumper assembly, comprising: an elongated extruded metal bumper having a continuous constant transverse cross-section, at least one upright bumper guard fixed to the bumper, an elongated impact resistant plastic longitudinal bumper guard secured to said bumper on either side of said bumper guard generally in the longitudinal axis of said bumper, said longitudinal bumper guard being channel-shaped in transverse cross-section, opening toward said bumper, having an end wall generally parallel to said bumper and opposed integral side walls terminating in integral spaced connectors projecting toward said bumper generally parallel to said side walls and said bumper having two longitudinal rows of generally parallel spaced apertures on either side of said upright bumper guard receiving said connectors and retaining said longitudinal bumper guards in generally parallel relation.

18. The bumper assembly defined in claim 17, wherein said upright bumper guard is self-supporting and formed of an impact resistant plastic, said upright plastic guard having an upright U-shaped channel portion conforming to the shape of the bumper and opposed lateral wing portions overlying said bumper having integral connectors lockingly received in spaced apertures in said bumper.

19. The bumper assembly defined in claim 18, wherein said longitudinal bumper guards each have an end wall defining an enclosure within said channel section receiving and enclosing said upright bumper guard wing portions.

* * * * *